United States Patent [19]

Kersey et al.

[11] Patent Number: 4,889,986

[45] Date of Patent: Dec. 26, 1989

[54] SERIAL INTERFEROMETRIC FIBER-OPTIC SENSOR ARRAY

[75] Inventors: Alan D. Kersey, Springfield; Anthony Dandridge, Alexandria, both of Va.

[73] Assignee: The United States of America as represented by the Secretary of the Navy, Washington, D.C.

[21] Appl. No.: 233,521

[22] Filed: Aug. 18, 1988

[51] Int. Cl.[4] .............................................. G01B 9/02
[52] U.S. Cl. ................................ 250/227; 250/231 R; 356/345
[58] Field of Search .............. 250/231 R, 227, 231 P; 356/345

[56] References Cited

U.S. PATENT DOCUMENTS

| | | | |
|---|---|---|---|
| 4,545,253 | 10/1985 | Avicola | 250/227 |
| 4,697,926 | 10/1987 | Youngquist | 356/345 |
| 4,699,513 | 10/1987 | Brooks et al. | 250/227 |
| 4,770,535 | 9/1988 | Kim et al. | 356/345 |
| 4,775,216 | 10/1988 | Layton | 250/227 |

*Primary Examiner*—Edward P. Westin
*Attorney, Agent, or Firm*—Thomas E. McDonnell; George Jameson

[57] ABSTRACT

A new serial interferometric fiber-optic sensor array configuration is disclosed. In a preferred embodiment of the invention pulsed light from a laser source is transmitted into a long input fiber which forms a series of N sensor elements, each of optical path length L. Each sensor element is responsive to any change in an associated predetermined physical parameter for changing its optical path length. A small portion of the optical power in the input fiber is tapped-off to a long output fiber at tap points between adjacent sensor elements and at tap points before the first and after the last sensor elements in order to produce at the output of the last sensor element a series of N+1 pulses separated in the time domain. This series of N+1 pulses from the output of the last sensor element is applied to each of two paths in a compensating interferometer of optical path imbalance L. The compensating interferometer coherently mixes pulses obtained from each adjacent pair of tap points to obtain a series of interferometric signals respectively indicative of any change in the physical parameters to which the sensor elements are respectively responsive.

16 Claims, 2 Drawing Sheets

SERIAL INTERFEROMETRIC FIBER-OPTIC SENSOR ARRAY

BACKGROUND OF THE INVENTION

The present invention relates to fiber-optic sensors and particularly to a serial interferometric fiber-optic sensor array for sensing changes in environmental conditions or physical phenomena.

Fiber-optic sensors have been developed for use in many sensing applications in a wide range of fields. This is due to the high sensitivity of optical fibers to various environmental conditions or physical phenomena which affect such optical fibers. For example, factors such as temperature, pressure, electromagnetic fields, and acoustical waves directly affect the light transmitting characteristics of optical fiber. These changes in the optical fiber produce a change in the phase of light signals traveling through that optical fiber. As a result, a measurement of the change in phase of light signals propagated through the optical fiber is representative of changes in those physical phenomena which have affected that fiber.

In recent developments, fiber-optic sensors have been implemented into sets or arrays so that a number of sensors can utilize light from a single source and provide environmental information on physical phenomena from various locations to a common processing location for subsequent processing. Such arrays of sensors can be used, for example, in various geophysical exploration and antisubmarine warfare applications.

A fiber-optic sensor array can be implemented in a variety of different configurations, some of which being very complex. Typically, a fiber-optic sensor can include a fiber input bus for carrying light to an array of sensors, with each sensor imparting information about the local environment to this light. This information can be collected by an output fiber bus and propagated to the common processing location, where information obtained from any selected one of the sensors can be readily identified and analyzed.

In the development of these fiber-optic sensor arrays a number of different approaches have been proposed by which information from each sensor in an array is demultiplexed, or separated, for individual identification from among all of the information arriving at the common processing location from the output fiber bus. Some of these approaches are based on conventional formats of frequency and time division multiplexing, while other approaches involve more optically complex and specialized schemes such as coherence multiplexing. As a result, present fiber-optic sensor arrays essentially include many optical fibers and optical components, which make them expensive and difficult to operate.

OBJECTS OF THE INVENTION

One object of the invention is to provide an improved fiber-optic sensor array.

Another object of the invention is to provide a novel serial interferometric fiber-optic sensor array.

Another object of the invention is to provide a simple, inexpensive, compact array of interferometric fiber-optic sensors to be efficiently addressed and demodulated using a minimal number of optical components and connecting fibers.

A further object of the invention is to provide a serial array of interferometric fiber-optic sensor elements which are tapped before the first sensor element, between adjacent sensor elements, and after the last sensor element by a single output fiber bus.

SUMMARY OF THE INVENTION

These and other objects of the invention are achieved by providing a serial fiber-optic sensor array which comprises: an input fiber formed into a series of N sensor elements at separated locations along the input fiber, each of the sensor elements being of optical path length L and being responsive to any change in an associated predetermined physical parameter for changing its optical path length; a light source for selectively transmitting a light pulse into the input fiber; an output fiber coupled to the series of N sensor elements for coupling a predetermined portion of the light pulse at each location before the first sensor element, between adjacent ones of the sensor elements and after the Nth sensor element in order to produce at the output of the Nth sensor element a series of $N+1$ pulses separated in the time domain; and output means of optical path length L being responsive to the $N+1$ pulses for coherently mixing pulses obtained from each pair of consecutive locations to obtain a series of N interferometric signals respectively indicative of any changes in the physical parameters to which the sensor elements are respectively responsive.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views, and wherein.

DETAILED DESCRIPTION OF THE PREFERRED EMBODIMENT

Figure 1:
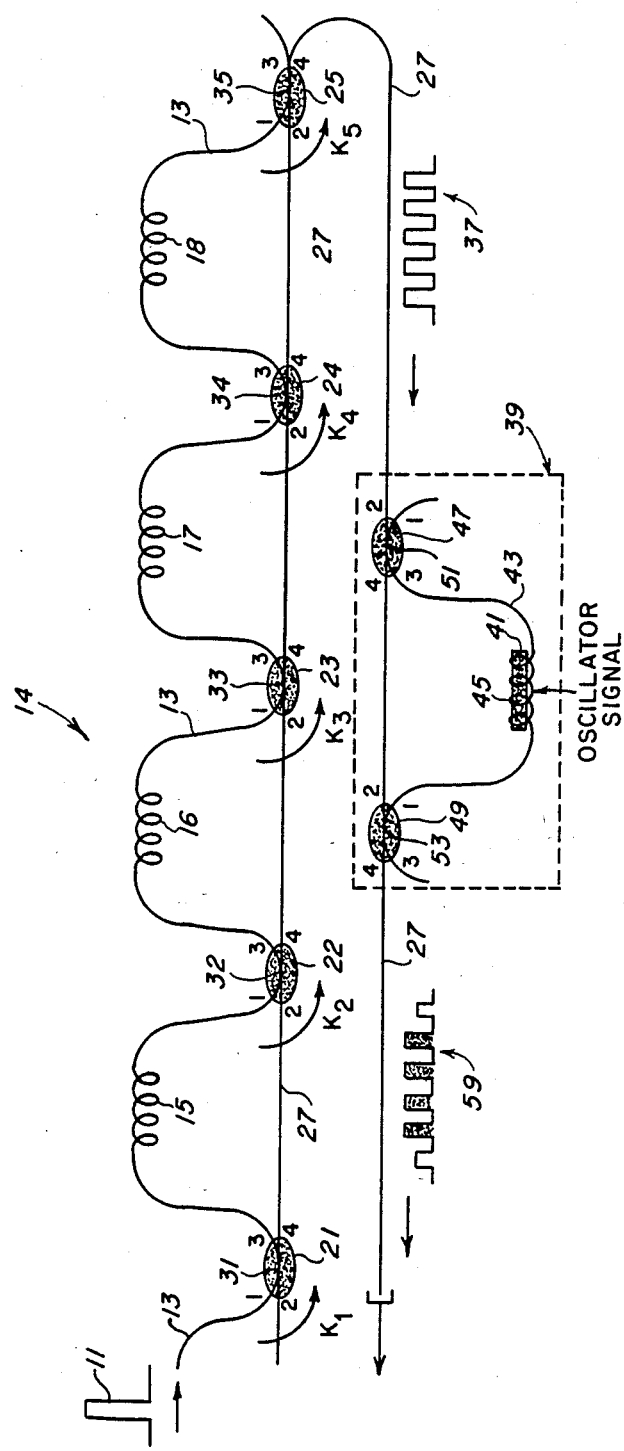
FIG. 1 is a schematic block diagram of a preferred embodiment of the serial array configuration of the invention.

Referring now to FIG. 1 a schematic block diagram of a preferred embodiment of the invention is shown. An input pulse 11 of light from a laser source (FIG. 3) is launched into an input optical fiber 13 formed into an exemplary serial array 14 of N sensors or sensor elements at separated locations along the input optical fiber 13. For purposes of this description, let $N=4$. Thus, as shown in FIG. 1, the array 14 is comprised of sensor elements 15–18. Each of the sensor elements 15–18 has a preselected optical path length L. These sensors 15–18 monitor environmental conditions or physical phenomena (such as changes in temperature, pressure, electromagnetic fields and acoustical waves) which selectively produce changes in the phase of the input pulse 11 traveling through the sensors 15–18.

Fiber directional couplers 21–25 are utilized to couple the input optical fiber 13 to an output optical fiber bus 27 at preselected tap points or locations 31–35 along the input optical fiber 13, where the input and output optical fibers 13 and 27 abut each other within the respective couplers 21–25. These locations 31–35 are respectively selected to be before the sensor element 15, between each of sensor element pairs 15 and 16, 16 and 17 and 17 and 18, and after sensor element 18.

Each of the directional couplers 21-25 is constructed, by conventional means well known in the art, to have a power splitting ratio (or tap ratio) of, for example, 1%. Furthermore, each of the couplers 21-25 has input ports 1 and 2 and output ports 3 and 4, with the input optical fiber 13 passing between ports 1 and 3 and the output optical fiber 27 passing between ports 2 and 4 of each of the couplers 21-25.

Because of the power splitting ratio of 1%, 99% of the optical power that enters input port 1 of each of the couplers 21-25 propagates to the output port 3 of each coupler and remains in the input optical fiber 13. On the other hand, only 1% of the optical power that enters input port 1 of each of the couplers 21-25 is cross-coupled to the output port 4 of each of the couplers 21-25 and into the output optical fiber 27. In a similar manner, 99% of the optical power that enters input port 2 of one of the couplers 22-25 is passed to output port 4 of that coupler and remains in the output optical fiber 27. No light is injected into or cross-coupled into input port 2 of coupler 21.

Thus, only a small fraction $K_j$ (1% in this description) of the optical power in fiber 13 is tapped-off to the output fiber bus 27 at each of the tap points or locations 31-35. The output of the sensor array 14 is developed at output port 4 of the coupler 25. If the optical propagation delay in each of the sensor elements 15-18 is greater than the width of the input pulse 11, the output of the array 14 consists of a pulse train or series of $N+1$ pulses 37 which are separated in the time domain. Since $N+1=5$ in this description, there are five pulses in the pulse train 37 at the output port 4 of coupler 25. These five pulses in the pulse train 37 were respectively obtained from the consecutive tap points 21-25 in the array 14. Apart from crosstalk effects, which will be discussed later, these pulses in the pulse train 37 carry no direct interferometric information.

The pulse train 37 is applied to a compensating interferometer 39, which is environmentally isolated. The compensating interferometer 39 includes a piezoelectric transducer 41, an optical fiber segment 43 formed into a delay coil 45 which is wound around the transducer 41, and two 3dB fiber directional couplers 47 and 49. Couplers 47 and 49 couple the fiber segment 43 to the output optical fiber 27 at locations 51 and 53 along the fiber 27, where the fiber segment 43 abuts against the fiber 27 within the respective couplers 47 and 49. Each of the couplers 47 and 49 has input ports 1 and 2 and output ports 3 and 4, with opposite ends of the fiber segment 43 passing between ports 1 and 3 of the respective couplers 47 and 49, and the output optical fiber 27 passing between ports 2 and 4 of each of the couplers 47 and 49. The compensating interferometer 39 has an optical path length inbalance of L between the path through the fiber 27 and the path through the delay coil 45. This imbalance is due to the fact that the delay coil 45, like each of the sensor elements 15-18, has an optical path length L.

Figure 2:
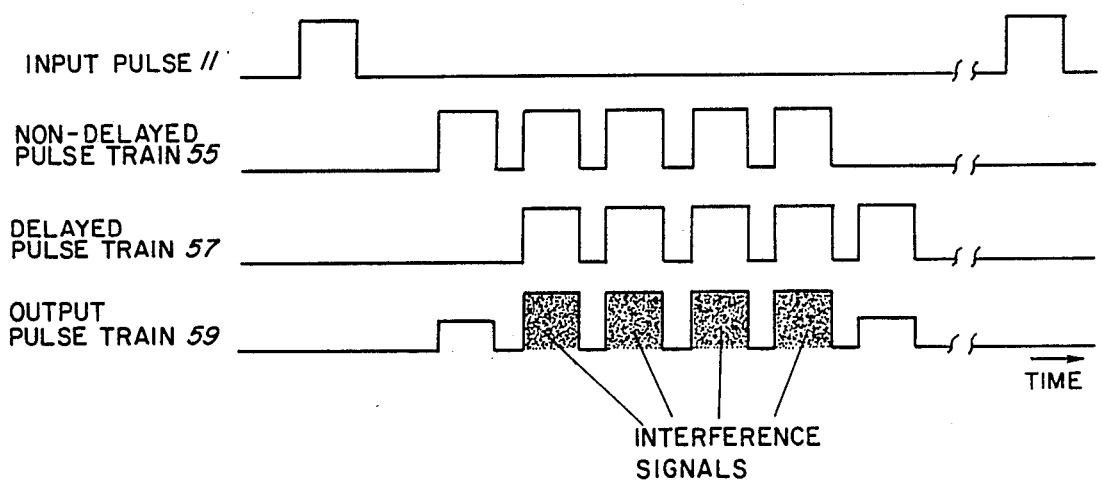
FIG. 2 illustrates waveforms useful in explaining the operation of the invention.

The waveforms of FIG. 2 will also be referred to at this time to better explain the operation of the compensating interferometer 39.

The input pulse 11, as discussed above, causes the optical pulse train 37 to be developed at the output port 4 of coupler 25. When the optical pulse train 37 is applied to the compensating interferometer 39, one-half of the optical power in the pulse train 37 goes through the output optical fiber 27 to input port 2 of coupler 49 as a non-delayed pulse train 55. The remaining one-half of the optical power in the pulse train 37 is delayed one optical path length L by the delay coil 45 before arriving at input port 1 of coupler 49 as delayed pulse train 57.

Time-coincident pulses in the non-delayed pulse train 55 and in the delayed pulse train 57 are coherently mixed in the coupler 49 of the compensating interferometer 39 to develop at the output port 4 of coupler 49 an output pulse train 59 consisting of a series of $N+2$ pulses, which in this description is a series of six pulses. Note that the first and last pulses in the pulse train 59 contain no interferometric signals, while the central four pulses in the pulse train 59 carry interferometric information generated by the sensor elements 15-18. The interferometric information in the central four pulses of the pulse train 59 indicates the respective amounts of stress, and hence phase shifts, experienced by the sensor elements 15-18 in the array 14.

A sinusoidal oscillator signal at a preselected high frequency, such as 20 KHz, is applied to the piezoelectric transducer 41 to produce in the delay coil 45 a phase carrier signal of $2\pi$ radians peak-to-peak at the exemplary 20 KHz modulates the 'interferometric signal' carried by each of the central four pulses in the output pulse train 59. This phase carrier signal is subsequently used to demodulate the four interferometric signals produced by the compensating interferometer 39. In an alternative embodiment of FIG. 1, the piezoelectric transducer 41 and its associated oscillator signal may be eliminated.

In general, the coupling ratios of the directional couplers required to equalize the returned power from each of the tap points in the array 14 can be derived by simply equating the power from the first tap in the array 14 to that from the $n^{th}$ tap in the array 14, i.e., (1 n N), where N = the number of sensor elements in the array 14 and n = an integer between 1 and N. This produces the relationship:

$$K_1.(1-K_2).(1-K_3)....(1-K_{N+1}) = (1-K_1)... .(1-K_{n-1}).K_n.(1-K_{n+1})....(1-K_{N+1}). \quad (1)$$

where K is a power tapping ratio. This sets a requirement of:

$$K_1/(1-K_1) = K_n/(1-K_n), \quad (2)$$

i.e., equal power splitting (K) at each tap point. The power in each pulse at the output of the array 14 (at port 4 of coupler 25) is thus:

$$P_n = n.P_o = K.(1-K)^N.P_o, \quad (3)$$

where $P_o$ is the peak power in the input pulse 11. This neglects multiple cross-coupling of the pulses in the array 14, and excess loss in the system, which would be expected to modify this result only slightly for losses <0.2 dB/coupler. The intrinsic crosstalk between sensors can be shown to be directly related to the power tapping ratio K, and can be assessed by considering the number of interfering pulses generated in the output of the array 14. Taking into account first order crosstalk effects only (i.e. pulses which cross-couple back from the output fiber 27 to the sensor array 14 and back again), it can be shown that the number of crosstalk pulses received in the $n^{th}$ time slot (i.e. $t=nT$, where T is the optical delay through each sensor of length L) at the array output is given by $$M = Nn - n^2 \qquad (4)$$

Each of these pulses is a factor $K^2$ weaker than the primary tapped pulses, but mix interferometrically at the output of the compensating interferometer 39 with primary pulses derived from adjacent time slots (i.e. $(n-1)T$ and $(n+1)T$) to produce crosstalk. This leads to a worse case time averaged crosstalk (sensor to sensor) for a centrally located sensor of $$<\gamma> = K/\sqrt{2} \qquad (5)$$

This is the result which would be expected intuitively, and again neglects excess losses and polarization effects.

It should be noted at this time that in FIG. 1, each pair of adjacent couplers (e.g. 21 and 22) and the intervening portions of the output fiber 27 and the input fiber 13, including the associated one of the sensor coils 15-18 (e.g. 15), between that pair of adjacent couplers form a Mach Zehnder interferometer. Therefore, in the embodiment shown in FIG. 1, there are four Mach Zehnder interferometers serially disposed between the couplers 21 and 25.

Figure 3:
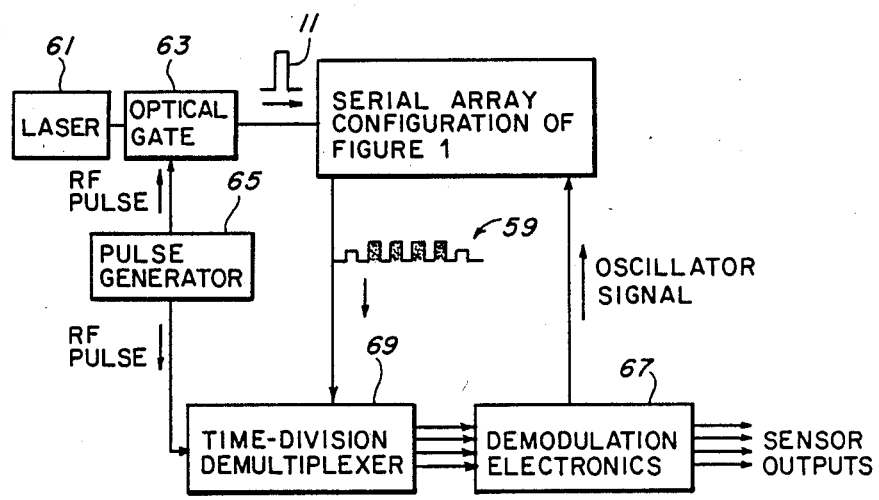
FIG. 3 illustrates a system in which the preferred embodiment of FIG. 1 can be utilized.

Referring now to FIG. 3, a system is shown for utilizing the embodiment of FIG. 1. Light from a suitable laser 61 is passed through an isolator (not shown) and into an optical gate or acousto-optic modulator (AOM) 63. The AOM 63 is typically a Bragg cell.

The light from laser 61 normally passes through the AOM 63 without being transmitted into the input optical fiber 13 (FIG. 1). However, each time that a short RF pulse is applied from a pulse generator 65 to the AOM 63, the laser light is deflected through the AOM 63 and is launched as input pulse 11 into the input fiber 13 and serial array 14 of FIG. 1, as discussed before. Typically, 70-80% of the light from the laser 61 is deflected into the optical fiber 13 of FIG. 1 during the RF pulse.

The oscillator signal that is applied to the piezoelectric transducer 41 in FIG. 1 is generated by a conventional demodulation electronics circuit 67. It will be recalled that this oscillator signal to the transducer 41 causes a non-reciprocal phase carrier signal of $2\pi$ radians peak-to-peak at 20 KHz to be produced in the sensor coil 45 to modulate the 'interferometric signal' carried by each of the central four pulses in the output pulse train 59.

The output pulse train 59 that is produced by the compensating interferometer 39 of FIG. 1 is applied to a conventional time-division demultiplexer 69. For proper timing, the same RF pulse that is applied to the AOM 63 to initiate the operation to develop the output pulse train 59 is also applied as a synchronizing signal to the demultiplexer 69.

The time division demultiplexer 69 comprises a number of gates, switches and channels (not shown). Basically, the demultiplexer 69 performs a sample and hold operation on each of the interferometric signals contained in the output pulse train 59 and separates or demultiplexes them into respective output channels. Since only four exemplary sensing elements 15-18 are used in the embodiment of FIG. 1, only four channels are needed at the output of the demultiplexer 69. Thus, in response to the synchronizing RF pulse from pulse generator 65, the time-division demultiplexer 69 separates or demultiplexes the central four pulses in the output pulse train 59 into four respective output channels.

The four time-division demultiplied outputs from demultiplexer 69 now have to be demodulated by the demodulation electronics circuit 67. The demodulation process performed by the circuit 67 linearizes each interferometric signal in the four output channels of demultiplexer 69. The interferometric signal generated by each overlapping pair of pulses, or time-coincident pulses, in the non-delayed pulse train 55 and in the delayed pulse train 57 is a $(1+\cos\phi)$ function of the phase difference $\phi$ between those pulses. This is not a linear function.

Demodulation of the time-division demultiplexed outputs of demultiplexer 69 can be achieved using either 'phase generated carrier' homodyne or synthetic-heterodyne techniques applied to the compensating interferometer 39 of FIG. 1. In this description the outputs of demultiplexer 69 are demodulated by using the synthetic-heterodyne technique. This technique, as described before, involves the application of the oscillator signal to the piezoelectric transducer 41 to stretch the fiber in the sensor coil 45 and thereby produce a (false) phase carrier signal for interferometric signals developed by the compensating interferometer 39 (FIG. 1). Such a phase carrier signal is phase modulated by the interference signals in the output pulse train 59. This resultant phase modulated carrier on each of the four time-demultiplexed outputs of demultiplexer 69 can be demodulated by the demodulation electronics circuit 67 by using standard electronic circuitry, such as phase-locked loops and FM discriminators. The demodulated outputs of the circuit 67 are four linearized sensor outputs.

Therefore, what has been described is a new serial interferometric fiber-optic sensor array configuration which can be multiplexed using time-division addressing. The configuration is based on a serial network or array of sensor elements which is tapped between adjacent elements and before the first element and after the last element by a single output fiber bus.

It should therefore readily be understood that many modifications and variations of the present invention are possible within the purview of the claimed invention. It is therefore to be understood that within the scope of the appended claims, the invention may be practiced otherwise than as specifically described.

What is claimed and desired to be secured by Letters Patent of the United States is:

1. A serial fiber-optic sensor array comprising:
   an input fiber formed into a series of N sensor elements at separated locations along said input fiber, each of said sensor elements being of optical path length L and being responsive to any change in an associated predetermined physical parameter for changing its optical path length;
   a light source for selectively transmitting a light pulse into said input fiber;
   an output fiber;
   N+1 optical couplers for coupling said series of N sensor elements to said output fiber to enable a predetermined portion of said light pulse at each said location before the first said sensor element, between adjacent ones of said sensor elements and after the Nth said sensor element to be coupled out of said input fiber to said output fiber at said separated locations in order to produce at the output of said Nth sensor element a series of N+1 pulses separated in the time domain; and output means of optical path length L being responsive to said N+1 pulses for coherently mixing pulses obtained from each pair of consecutive said locations to obtain a series of N interferometric signals respectively indicative of any changes in the physical parameters to which said sensor elements are respectively responsive.

2. The serial fiber-optic sensor array of claim 1 further including:

means for monitoring said series of N interferometric signals to detect any change in the physical parameters to which said sensor elements are respectively responsive.

3. The serial fiber-optic sensor array of claim 2 wherein said monitoring means includes:

means responsive to said series of N interferometric signals for producing N time-division demultiplexed signals; and means for demodulating said N time-division demultiplexed signals to produce N sensor output signals.

4. The serial fiber-optic sensor array of claim 1 wherein:

said light source produces a sequence of light pulses having an interpulse period greater than the optical propagation delay of a light pulse through said serial fiber optic sensor array.

5. The serial fiber-optic sensor array of claim 4 wherein said light source comprises:

an optical gate;

a laser for transmitting light through said optical gate; and a pulse generator for applying radio frequency pulses to said optical gate, said optical gate being responsive to each radio frequency pulse for deflecting light from said laser into said input fiber during the duration of each said radio frequency pulse.

6. The serial fiber-optic sensor array of claim 1 wherein:

said output means includes a compensating interferometer.

7. The serial interferometric fiber-optic sensor array of claim 1 wherein:

said input and output fibers and said serial array of N interferometric fiber optic sensors collectively form N serially-coupled Mach-Zehnder interferometers.

8. The serial fiber-optic sensor array of claim 1 wherein:

each of said plurality of optical couplers has a coupling ratio of approximately one-percent so that each optical coupler couples approximately one-percent of the light at its associated said location from said input fiber to said output fiber.

9. The serial fiber-optic sensor array of claim 1 wherein:

said input fiber formed into a series of N sensor elements, said output fiber and said plurality of optical couplers, in combination, form N serially-coupled Mach-Zehnder interferometers.

10. The serial fiber-optic sensor array of claim 9 wherein:

said output means includes a compensating interferometer.

11. The serial fiber-optic sensor array of claim 9 further including:

means for monitoring said series of N interferometric signals to detect changes in the physical parameters to which said sensor elements are respectively responsive.

12. The serial fiber-optical sensor array of claim 11 wherein said monitoring means includes:

means responsive to said series of N interferometric signals for producing N time-division demultiplexed signals; and means for demodulating said N time-division demultiplexed signals to produce N sensor output signals.

13. The serial fiber-optic sensor array of claim 12 wherein:

said output means includes a compensating interferometer.

14. A serial interferometric fiber-optic sensor array comprising:

an input fiber;

an output fiber;

a light source for selectively transmitting a light pulse into said input fiber;

a serial array of N interferometric fiber-optic sensors positioned at separated locations along said input fiber for sequentially receiving said light pulse from said source, each of said sensors being of length L and being responsive to a predetermined physical parameter;

N+1 optical couplers for coupling said N sensors to said output fiber to enable a preselected fraction of said light pulse at each said location before the first said sensor, between adjacent ones of said sensors, and after the Nth said sensor to be coupled out of said input fiber to said output fiber at said separated locations in order to produce at the output of said Nth sensor a series of N+1 pulses separated in the time domain;

a compensating interferometer of optical path length L for coherently mixing pulses obtained from each pair of consecutive said locations to obtain a train of N interferometric signals indicative of any change in the physical parameters to which said interferometric fiber-optic sensors are responsive.

15. The serial interferometric fiber-optic sensor array of claim 14 further including:

means for monitoring said train of N interferometric signals to detect any change in the physical parameters to which said sensor elements are respectively responsive.

16. The serial interferometric fiber-optic sensor array of claim 15 wherein said monitoring means includes:

means responsive to said train of N interferometric signals for producing N time-division demultiplexed signals; and means for demodulating said N time-division demultiplexed signals to produce N sensor output signals.

* * * * *